United States Patent
Tsukamoto et al.

(10) Patent No.: US 11,831,212 B2
(45) Date of Patent: Nov. 28, 2023

(54) STATOR, ELECTRIC MOTOR, COMPRESSOR, AND AIR CONDITIONER

(71) Applicant: Mitsubishi Electric Corporation, Tokyo (JP)

(72) Inventors: Emi Tsukamoto, Tokyo (JP); Koji Yabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 580 days.

(21) Appl. No.: 17/054,699

(22) PCT Filed: Jun. 1, 2018

(86) PCT No.: PCT/JP2018/021159
§ 371 (c)(1),
(2) Date: Nov. 11, 2020

(87) PCT Pub. No.: WO2019/229972
PCT Pub. Date: Dec. 5, 2019

(65) Prior Publication Data
US 2021/0083541 A1 Mar. 18, 2021

(51) Int. Cl.
*H02K 3/28* (2006.01)
*H02K 1/12* (2006.01)
*H02K 3/02* (2006.01)
*H02K 3/18* (2006.01)
*H02K 9/22* (2006.01)

(52) U.S. Cl.
CPC ............... *H02K 3/28* (2013.01); *H02K 1/12* (2013.01); *H02K 3/02* (2013.01); *H02K 3/18* (2013.01); *H02K 9/22* (2013.01); *H02K 2213/03* (2013.01)

(58) Field of Classification Search
CPC ............ H02K 3/04; H02K 3/18; H02K 3/522; H02K 9/22; H02K 2213/03
(Continued)

(56) References Cited

U.S. PATENT DOCUMENTS 11,496,006 B2 * 11/2022 Tsukamoto .......... H02K 15/105
2016/0105061 A1 4/2016 Horisaka et al.
(Continued)

FOREIGN PATENT DOCUMENTS

EP 2207254 A2 7/2010
JP H09-074702 A 3/1997
(Continued)

OTHER PUBLICATIONS

Machine translation of JP-2006014471-A (Year: 2006).*
(Continued)

*Primary Examiner* — Quyen P Leung
*Assistant Examiner* — Minki Chang
(74) *Attorney, Agent, or Firm* — POSZ LAW GROUP, PLC

(57) ABSTRACT

A stator includes a stator core and a coil wound around the stator core. The coil includes at least one first winding and at least one second winding connected to the first winding in series. The stator satisfies $(C_1/S_1) > (C_2/S_2)$, where $S_1$ is a total cross-sectional area on a first side of a coil-end part of the coil, $S_2$ is a total cross-sectional area on a second side of the coil-end part, $C_1$ is a total cross-sectional area of the first winding on the first side, and $C_2$ is a total cross-sectional area of the first winding on the second side.

13 Claims, 5 Drawing Sheets

(58) Field of Classification Search
USPC .................................. 310/179, 180, 195, 208
See application file for complete search history.

(56) References Cited

U.S. PATENT DOCUMENTS

| | | |
|---|---|---|
| 2016/0322875 A1 | 11/2016 | Ogawa |
| 2018/0183282 A1 | 6/2018 | Aso et al. |
| 2018/0254682 A1 | 9/2018 | Aso et al. |
| 2020/0358327 A1 * | 11/2020 | Tsukamoto .............. H02K 3/12 |

FOREIGN PATENT DOCUMENTS

| | | | |
|---|---|---|---|
| JP | H10-290543 A | | 10/1998 |
| JP | 2006014471 A | * | 1/2006 |
| JP | 2010-166643 A | | 7/2010 |
| JP | 2010-183788 A | | 8/2010 |
| WO | 2014/188466 A1 | | 11/2014 |
| WO | 2015/111369 A1 | | 7/2015 |
| WO | 2015/155934 A1 | | 10/2015 |
| WO | 2017/104013 A1 | | 6/2017 |
| WO | 2017/104016 A1 | | 6/2017 |

OTHER PUBLICATIONS

Indian Office Action dated Jul. 14, 2021, issued in corresponding Indian Patent Application No. 202027045866 (and English Machine Translation).
International Search Report of the International Searching Authority dated Aug. 14, 2018 for the corresponding International application No. PCT/JP2018/021159 (and English translation).

* cited by examiner

STATOR, ELECTRIC MOTOR, COMPRESSOR, AND AIR CONDITIONER

CROSS REFERENCE TO RELATED APPLICATION

This application is a U.S. national stage application of International Patent Application No. PCT/JP2018/021159 filed on Jun. 1, 2018, the disclosure of which is incorporated herein by reference.

TECHNICAL FIELD

The present invention relates to a stator of an electric motor.

BACKGROUND

In the field of electric motors, increase in power and size reduction have been required in recent years. The increase in power of an electric motor causes an increase in current flowing in a coil of a stator. The size reduction of the electric motor also causes an increase in current necessary for obtaining the same power. The increase in current flowing in the coil causes a temperature rise of the coil. The temperature rise of the coil causes a decrease in efficiency of the electric motor. Thus, it is preferable to reduce a temperature rise of the coil by dissipating heat of the coil to the outside.

In an electric motor for use in a compressor, for example, a stator can be formed such that a coil-end part of a coil contacts refrigerant and lubricating oil in a compressor. Thus, heat generated in the coil is preferably dissipated from the coil-end part exposed to the outside of the coil. The calorific volume of the coil depends on the level of electrical resistance, and thus, electrical resistance of the coil is preferably low in order to reduce heat generation of the coil.

In recent years, in order to reduce costs and weight of an electric motor, it has been proposed to use an aluminum wire coil as well as a copper wire coil as a winding of the coil (see, for example, Patent Reference 1).

PATENT REFERENCE

Patent Reference 1: WO2014/188466

In the case of using a coil formed of different types of windings, however, heat dissipation efficiency from a coil-end part of the coil is insufficient in a conventional technique, and thus, there has been a problem of an insufficient reduction of a temperature rise of a stator, especially a temperature rise of the coil.

SUMMARY

It is therefore an object of the present invention to enhance heat dissipation efficiency in a coil-end part of a coil.

A stator of the present invention includes: a stator core; and a coil wound around the stator core and including at least one first winding and at least one second winding connected to the at least one first winding in parallel, the at least one second winding being formed of a material different from the at least one first winding, wherein the coil includes a coil-end part located outside the stator core, the stator satisfies: $(C_1/S_1)>(C_2/S_2)$ where P1 is a straight line that halves a maximum height of the coil-end part from a point of contact of the coil with the stator core in the coil-end part, $S_1$ is a total cross-sectional area on a first side of the coil-end part that is an opposite side of the straight line P1 from the stator core, $S_2$ is a total cross-sectional area on a second side of the coil-end part that is an opposite side of the straight line P1 from the first side, $C_1$ is a total cross-sectional area of the at least one first winding on the first side of the coil-end part, and $C_2$ is a total cross-sectional area of the at least one first winding on the second side of the coil-end part, and the stator satisfies: $\varphi Al \times \sqrt{(\rho Cu/\rho Al)} < \varphi Cu$ where $\varphi Cu$ [mm] is a diameter of the first winding, $\varphi Al$ [mm] is a diameter of the second winding, $\rho Cu$ [Ω·m] is electrical resistivity of the first winding, and $\rho Al$ [Ω·m] is electrical resistivity of the second winding.

According to the present invention, heat dissipation efficiency in the coil-end part of the coil can be enhanced.

DETAILED DESCRIPTION

First Embodiment

In an xyz orthogonal coordinate system shown in each drawing, a z-axis direction (z axis) represents a direction parallel to an axis Ax of a rotor 3 of an electric motor 1, an x-axis direction (x axis) represents a direction orthogonal to the z-axis direction (z axis), and a y-axis direction (y axis) represents a direction orthogonal to both of the z-axis direction and the x-axis direction. The axis Ax is a rotation center of the rotor 3. The direction parallel to the axis Ax will be referred to as an "axial direction of the rotor 3" or simply as an "axial direction." A radial direction is a direction orthogonal to the axis Ax.

Figure 1:
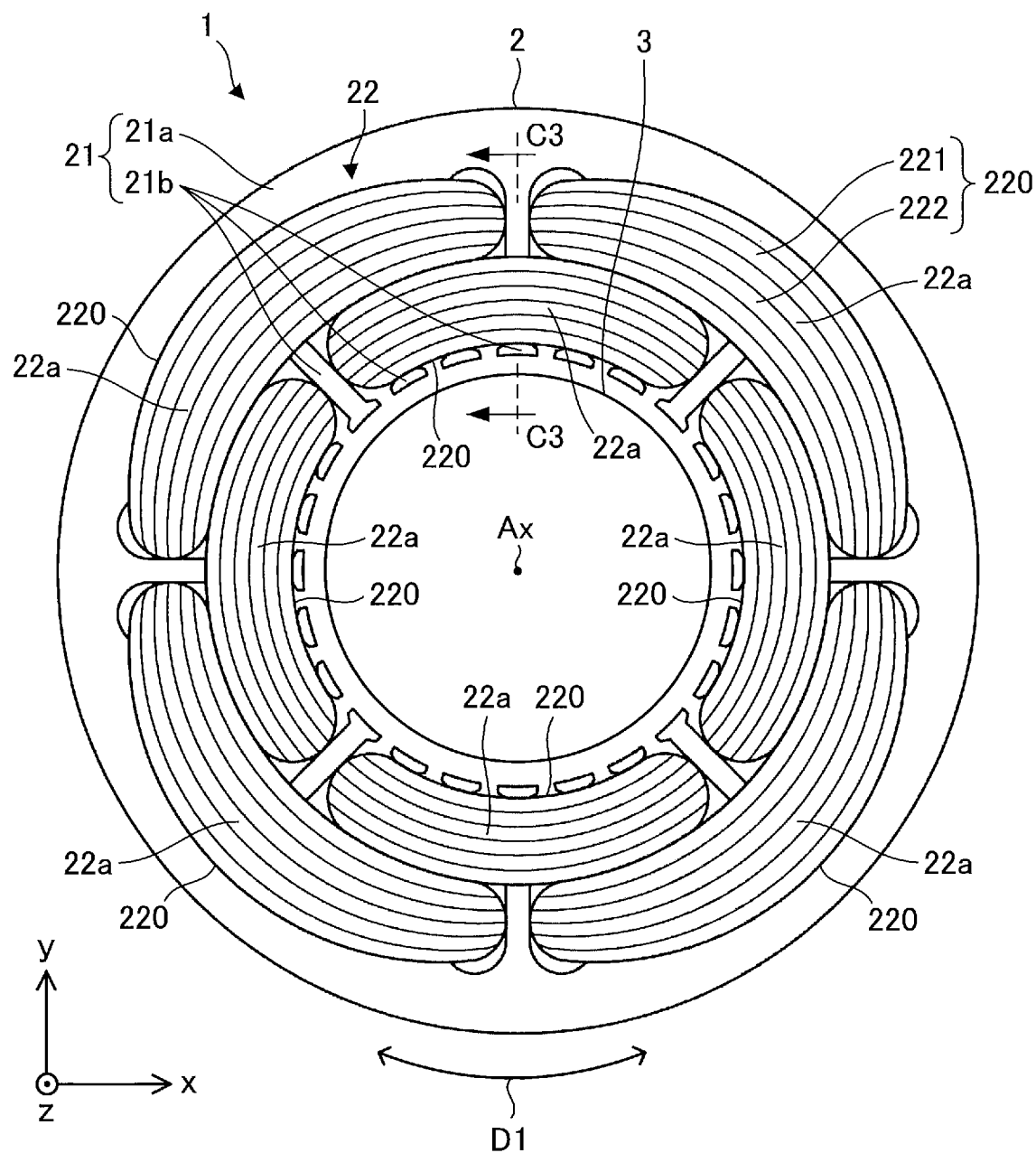
FIG. 1 is a plan view schematically illustrating a structure of an electric motor according to a first embodiment of the present invention.

FIG. 1 is a plan view schematically illustrating a structure of the electric motor 1 according to a first embodiment of the present invention. An arrow D1 represents a circumferential direction of a stator 2 about the axis Ax. The arrow D1 also represents a circumferential direction of the rotor 3 about the axis Ax. The circumferential directions of the stator 2 and the rotor 3 will be also referred to simply as "circumferential directions."

The electric motor 1 includes the stator 2 and the rotor 3. The electric motor 1 is, for example, an induction motor. The electric motor 1 is used for, for example, a compressor such as a scroll compressor.

The rotor 3 is rotatably disposed inside the stator 2.

The stator 2 includes a stator core 21 and a coil 22 (also referred to as a stator coil).

The stator core 21 is formed in a ring shape. The stator core 21 is formed by stacking a plurality of electromagnetic steel sheets in the axial direction. The plurality of electromagnetic steel sheets are fixed together by swaging. Each of the plurality of electromagnetic steel sheets is punched into a predetermined shape. Each of the plurality of electromagnetic steel sheets has a thickness of, for example, 0.1 mm to 0.7 mm.

The stator core 21 includes a yoke 21a and a plurality of teeth 21b. The yoke 21a is formed in an annular ring shape. Each of the teeth 21b extends radially from the yoke 21a. In other words, each of the teeth 21b projects from the yoke 21a toward the rotation center of the rotor 3.

The teeth 21b are arranged at regular intervals in the circumferential direction. Space formed between each adjacent two of the teeth 21b in the circumferential direction is a slot. The number of the teeth 21b is, for example, 30. It should be noted that the number of the teeth 21b is not limited to 30. Front ends of the teeth 21b expand in the circumferential direction.

The coil 22 is wound around the stator core 21. Specifically, the coil 22 is wound around the teeth 21b. In the example illustrated in FIG. 1, the coil 22 is wound around the stator core 21 by distributed winding. The winding of the coil 22 is not limited to the distributed winding. For example, the coil 22 may be wound around the stator core 21 by concentrated winding.

The coil 22 includes a plurality of bundles 220. Each of the bundles 220 will be also referred to as a coil bundle. In the example illustrated in FIG. 1, each of the bundles 220 is wound around the stator core 21 by distributed winding. The coil 22 includes coil-end parts 22a located outside the stator core 21. Specifically, each of the bundles 220 includes the coil-end part 22a. The coil-end parts 22a are located outside the stator core 21 in the axial direction. In other words, the coil-end parts 22a are parts of the coil 22 located outside the stator core 21 in the axial direction. That is, the coil-end parts 22a are parts of the coil 22 illustrated in FIG. 1. It should be noted that the number of the bundles 220 and the number of the coil-end parts 22a are not limited to the example illustrated in FIG. 1.

Figure 2:
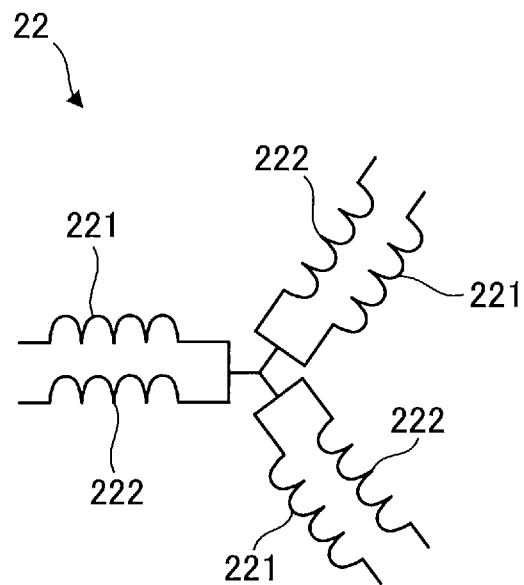
FIG. 2 is a view illustrating a connection state of a coil between a first winding and a second winding.

FIG. 2 is a view illustrating a connection state of the coil 22 between a first winding 221 and a second winding 222.

The coil 22 includes at least one first winding 221 and at least one second winding 222. The second winding 222 is connected to the first winding 221 in parallel. That is, each of the bundles 220 is constituted by the at least one first winding 221 and the at least one second winding 222. In the example illustrating FIG. 2, the coil 22 is a three-phase coil having a U phase, a V phase, and a W phase, and a connection of the coil 22 is a Y connection.

The first winding 221 is made of a material different from the second winding 222. The second winding 222 is made of a material different from the first winding 221. That is, the first winding 221 and the second winding 222 are made of different materials. The electrical resistivity of the second winding 222 is higher than that of the first winding 221. That is, the thermal conductivity of the second winding 222 is lower than that of the first winding 221.

In general, as the diameter of a winding decreases, heat loss density increases. In this embodiment, the diameter of the first winding 221 is smaller than that of the second winding 222. In this case, a heat loss quantity (also referred to as a "heat loss" or simply "loss") generated in the first winding 221 might be larger than a heat loss quantity generated in the second winding 222. For example, in a cross section (e.g., a yz plane illustrated in FIG. 3) of each coil-end part 22a of the coil 22, if the total cross-sectional area of the first winding 221 is equal to the total cross-sectional area of the second winding 222, the heat loss quantity generated in the first winding 221 is larger than the heat loss quantity generated in the second winding 222.

In this embodiment, the first winding 221 is a copper wire, and the second winding 222 is an aluminum wire. It should be noted that the first winding 221 is not limited to the copper wire, and the second winding 222 is not limited to the aluminum wire.

Figure 3:
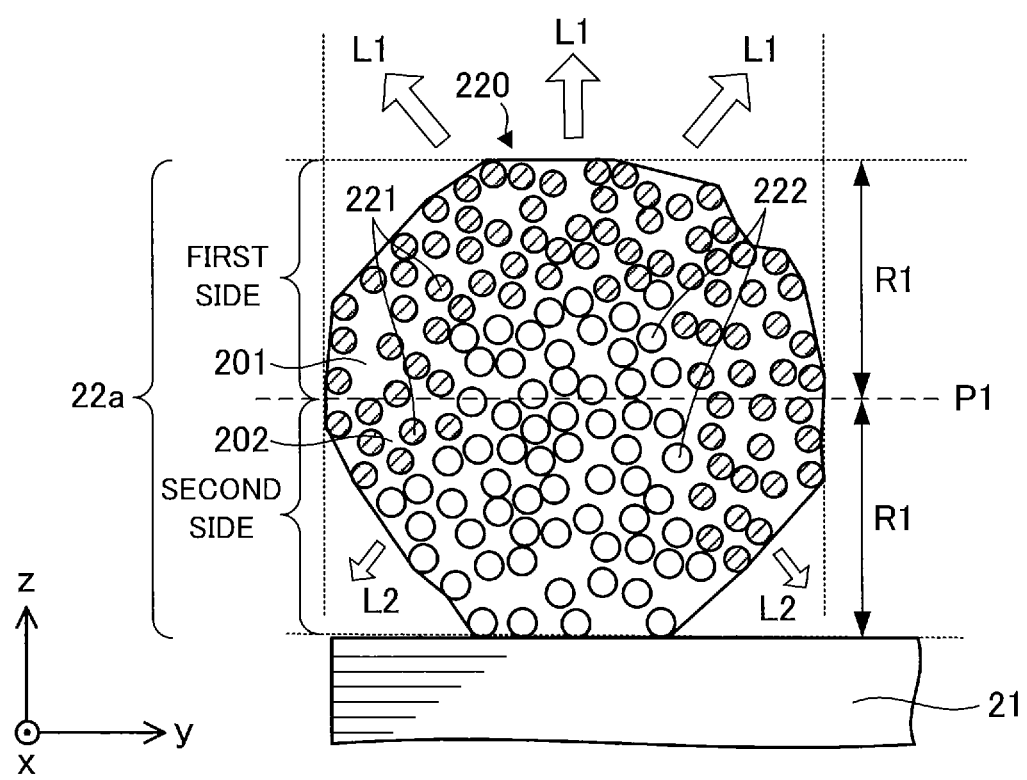
FIG. 3 is a cross-sectional view of a bundle of a coil taken along a line C3-C3 illustrated in FIG. 1.

FIG. 3 is a cross-sectional view of the bundle 220 (specifically, the coil-end part 22a of the bundle 220) of the coil 22 taken along a line C3-C3 illustrated in FIG. 1. An arrow L1 represents a heat dissipation path from a first side of the coil-end part 22a. An arrow L2 represents a heat dissipation path from a second side of the coil-end part 22a. Heat of the coil-end part 22a is dissipated toward the heat dissipation paths L1 and L2, especially the heat dissipation path L.

A straight line P1 is a line that halves the maximum height of the coil-end part 22a from a point of contact of the coil 22 with the stator core 21 in the coil-end part 22a. In the example illustrated in FIG. 3, the maximum height of the coil-end part 22a from the point of contact of the coil 22 with the stator core 21 is expressed by 2×R1. The maximum height of the coil-end part 22a is a maximum height in the axial direction.

The first side of the coil-end part 22a is an opposite side of the straight line P1 from the stator core 21. Specifically, the first side of the coil-end part 22a is a first region 201 at a +z side of the straight line P1. The second side of the coil-end part 22a is an opposite side of the straight line P1 from the first side of the coil-end part 22a. Specifically, the second side of the coil-end part 22a is a second region 202 at a −z side of the straight line P1. That is, a cross section of the coil-end part 22a includes the first region 201 and the second region 202 on the yz plane.

The first region 201 is a region surrounded by the straight line P1 and an outer edge formed by tangents to each winding (i.e., the first winding 221 or the second winding 222) disposed at the outer end on the first side of the bundle 220 on the yz plane. The second region 202 is a region surrounded by the straight line P1 and an outer edge formed by tangents to each winding (i.e., the first winding 221 or the second winding 222) disposed at the outer end on the second side of the bundle 220 on the yz plane.

In the example illustrated in FIG. 3, at least one first winding 221 and at least one second winding 222 are disposed in the first region 201, and at least one first winding 221 and at least one second winding 222 are also arranged in the second region 202.

Figure 4:
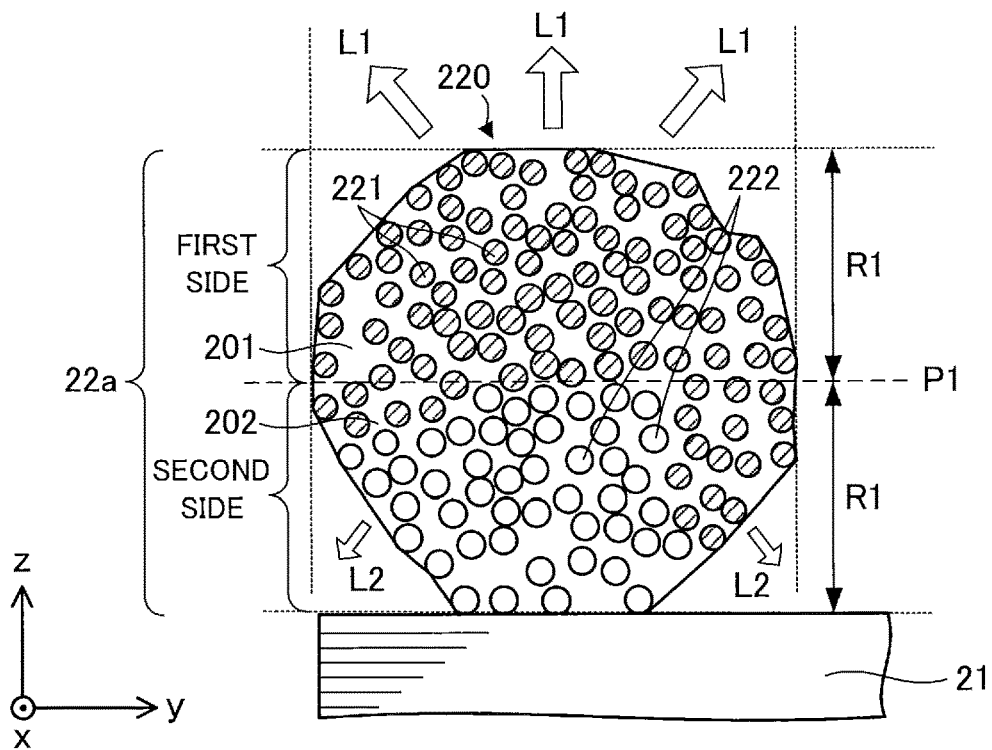
FIG. 4 is a cross-sectional view of the bundle of the coil taken along the line C3-C3 illustrated in FIG. 1.

FIG. 4 is a cross-sectional view of the bundle 220 (specifically, the coil-end part 22a of the bundle 220) of the coil 22 taken along the line C3-C3 illustrated in FIG. 1. Specifically, FIG. 4 is a cross-sectional view illustrating another example of the bundle 220 of the coil 22.

As illustrated in FIG. 4, only at least one first winding 221 may be disposed in the first region 201. In this case, no second winding 222 is present in the first region 201.

Let $S_1$ be a total cross-sectional area of the coil-end part 22a on the first side. That is, the total cross-sectional area $S_1$ is an area of the first region 201 on the yz plane. Let $S_2$ be a total cross-sectional area of the coil-end part 22a on the second side. The total cross-sectional area $S_2$ is an area of the second region 202 on the yz plane. Let $C_1$ be a total cross-sectional area of at least one first winding 221 of the coil-end part 22a on the first side. In other words, the total cross-sectional area $C_1$ is the sum of cross-sectional areas of the first windings 221 disposed in the first region 201. Let $C_2$ be a total cross-sectional area of at least one first winding 221 of the coil-end part 22a on the second side. In other words, the total cross-sectional area $C_2$ is the sum of cross-sectional areas of the first windings 221 disposed in the second region 202.

In this case, the stator 2 satisfies $(C_1/S_1)>(C_2/S_2)$. Here, $C_1/S_1$ is a ratio of at least one first winding 221 (specifically, the total cross-sectional area $C_1$ of the at least one first winding 221) to the total cross-sectional area $Si_1$. In addition, $C_2/S_2$ is a ratio of at least one first winding 221 (specifically, the total cross-sectional area $C_2$ of at least one first winding 221) to the total cross-sectional area $S_2$. In this manner, heat dissipation efficiency in the stator 2 can be enhanced.

Let $A_1$ be a total cross-sectional area of at least one second winding 222 disposed on the first side of the coil-end part 22a, and let $A_2$ be a total cross-sectional area of at least one second winding 222 disposed on the second side of the coil-end part 22a. In other words, the total cross-sectional area $A_1$ is a sum of cross-sectional areas of the second windings 222 disposed in the first region 201, and the total cross-sectional area $A_2$ is a sum of cross-sectional areas of the second windings 222 disposed in the second region 202. In this case, the stator 2 satisfies $(C_1/S_1)>(A_1/S_1)$. In this manner, heat dissipation efficiency in the stator 2 can be further enhanced.

In addition, the stator 2 preferably satisfies $(C_1/A_1)>(C_2/A_2)$. In this manner, heat dissipation efficiency in the stator 2 can be further enhanced.

Figure 5:
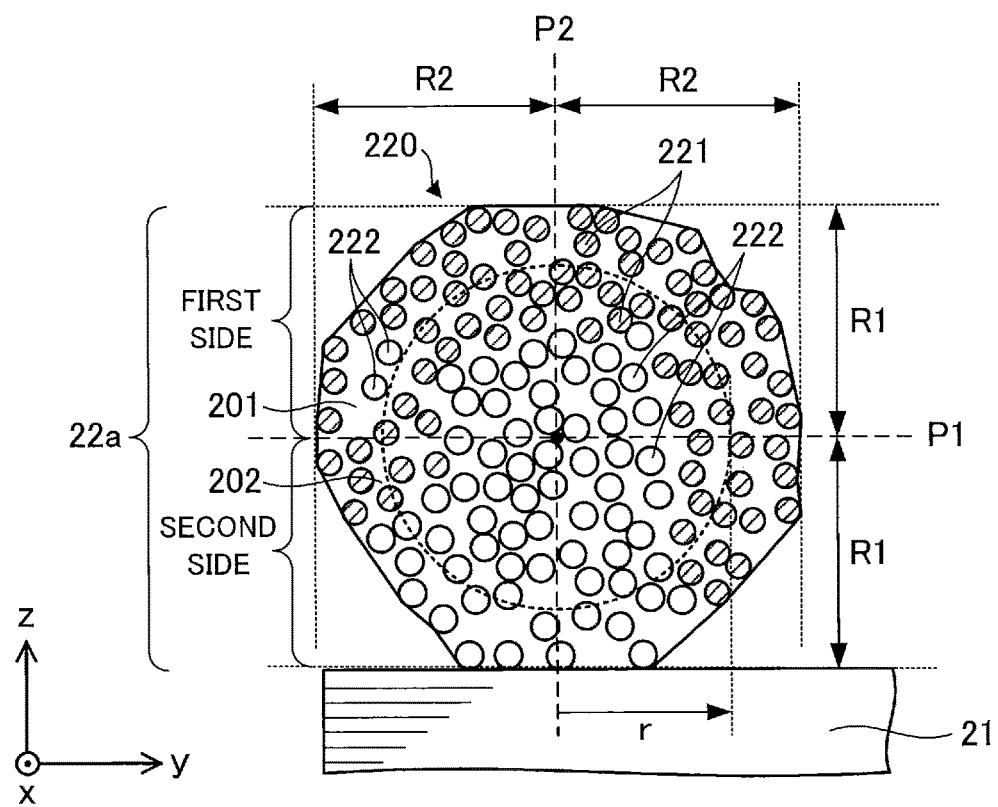
FIG. 5 is a cross-sectional view of the bundle of the coil taken along line the C3-C3 illustrated in FIG. 1.

FIG. 5 is a cross-sectional view of the bundle 220 (specifically, the coil-end part 22a of the bundle 220) of the coil 22 taken along the line C3-C3 illustrated in FIG. 1.

A straight line P2 is a line that halves the straight line P1 on a cross section of the coil-end part 22a. Thus, the length of the straight line P1 on the cross section of the coil-end part 22a is expressed by 2×R2. A radius r is a radius about an intersection point of the straight line P1 and the straight line P2 on a cross section of the coil-end part 22a. The radius r is smaller than a half of the length of the straight line P1 (i.e., R2) and a half of the length of the straight line P2 (i.e., R1) on the cross section of the coil-end part 22a.

Let $SO_1$ be a total cross-sectional area of a portion located outside a region surrounded by the radius r on the first side of the coil-end part 22a. Let $Si_1$ be a total cross-sectional area of the region surrounded by the radius r on the first side of the coil-end part 22a. The region surrounded by the radius r is a circle having the radius r about the intersection point of the straight line P1 and the straight line P2 on the yz plane. The total cross-sectional area $SO_1$ is an area of the portion located outside the region surrounded by the radius r in the first region 201 on the yz plane. In other words, the total cross-sectional area $SO_1$ is an area obtained by subtracting a semicircle having the radius r from the total cross-sectional area $S_1$. The total cross-sectional area $Si_1$ is an area of a region surrounded by the radius r in the first region 201 on the yz plane. In other words, the total cross-sectional area $Si_1$ is an area of a semicircle having the radius r in the first region 201.

On the yz plane, let $CO_1$ be a total cross-sectional area of at least one first winding 221 disposed outside the region surrounded by the radius r in the first region 201. In other words, the total cross-sectional area $CO_1$ is a sum of cross-sectional areas of the first windings 221 disposed outside the region surrounded by the radius r in the first region 201. On the yz plane, let $Ci_1$ be a total cross-sectional area of at least one first winding 221 disposed in the region surrounded by the radius r in the first region 201. In other words, the total cross-sectional area $Ci_1$ is a sum of cross-sectional areas of the first windings 221 disposed in the region surrounded by the semicircle having the radius r in the first region 201.

In this case, the stator 2 satisfies $(CO_1/SO_1)>(Ci_1/Si_1)$. Here, $CO_1/SO_1$ is a ratio of at least one first winding 221 (specifically, the total cross-sectional area $CO_1$ of at least one first winding 221) to the total cross-sectional area $SO_1$. In addition, $Ci_1/Si_1$ is a ratio of at least one first winding 221 (specifically, the total cross-sectional area $Ci_1$ of at least one first winding 221) to the total cross-sectional area $Si_1$. In this manner, heat dissipation efficiency in the stator 2 can be further enhanced.

<Diameter of Each Winding>

Next, a relationship between the diameter of the first winding 221 and the diameter of the second winding 222 will be described. Since the first winding 221 and the second winding 222 are connected in parallel, currents flowing in the first winding 221 and the second winding 222 are different. Thus, a current easily flows in the first winding 221 having low electrical resistance. In general, a heat loss quantity generated in a winding is proportional to a square of a current value. Thus, a loss generated in the first winding 221 having low electrical resistivity is larger than a loss generated in the second winding 222. Accordingly, as described above, it is preferable to collet preferable to collect first windings 221 generating large losses as many as possible in the first region 201 having high heat dissipation efficiency as described above.

The electrical resistance of each first winding 221 is $R_{Cu}$ [Ω], the electrical resistivity of the first winding 221 is $\rho_{Cu}$ [Ω·m], and the diameter of the first winding 221 is $\varphi_{Cu}$ [mm]. The electrical resistance of each second winding 222 is $R_{Al}$ [Ω], the electrical resistivity of the second winding 222 is $\rho_{Al}$ [Ω·m], and the diameter of the second winding 222 is $\varphi_{Al}$ [mm].

The diameter $\varphi_{Cu}$ of the first winding 221 is preferably lager than $\varphi_{Al} \times \sqrt{(\rho_{Cu}/\rho_{Al})}$. Accordingly, in the first region 201, a loss larger than a loss generated in the second winding 222 can be generated in the first winding 221. In this manner, heat dissipation efficiency can be enhanced as described above.

The electrical resistivity $\rho$ [Ω·m] of a coil is a physical property value that represents the difficulty in a current flow. The electrical resistance of the coil is obtained by multiplying the electrical resistivity $\rho$ by the length L of the coil and then dividing the product by the cross-sectional area S of the coil (i.e., $\rho \times L/S$).

In a case where the length L of the first winding 221 is equal to the length L of the second winding 222 and the diameter $\varphi_{Cu}$ of the first winding 221 is equal to the diameter $\varphi_{Al}$ of the second winding 222, the electrical resistance $R_{Al}$ [Ω] of the second winding 222 is expressed by $R_{Cu} \times (\rho_{Al}/\rho_{Cu})$ [Ω].

In a case where a current flowing in the coil 22 is 1 [A], a current flowing in the first winding 221 is expressed by $\rho_{Al}/(\rho_{Al}+\rho_{Cu})$, and a current flowing in the second winding 222 is expressed by $\rho_{Cu}/(\rho_{Al}+\rho_{Cu})$. A loss generated in the first winding 221 is expressed by $R_{Cu} \times (\rho_{Al}/(\rho_{Al}+\rho_{Cu}))^2$ [W]. A loss generated in the second winding 222 is expressed by $R_{Cu} \times (\rho_{Al}/\rho_{Cu}) \times (\rho_{Cu}/(\rho_{Cu}+\rho_{Cu}))^2 = R_{Cu} \times \rho_{Cu} \times (\rho_{Al}/(\rho_{Al}+\rho_{Cu})^2)$ [W].

In a case where a loss generated in the first winding 221 is equal to a loss generated in the second winding 222, the resistance [Ω] of the first winding 221 is expressed by $R_{Cu} \times (\rho_{Al}/\rho_{Cu})$ [Ω]. Supposing the cross-sectional area of one first winding 221 is $S_{Cu}$, since the electrical resistance is inversely proportional to the cross-sectional area of the winding, in the case where a loss generated in the first winding 221 is equal to a loss generated in the second winding 222, the resistance of the first winding 221 is expressed by $S_{Cu} \times (\rho_{Cu}/\rho_{Al})$. In addition, in the case where a loss generated in the first winding 221 is equal to a loss generated in the second winding 222, the diameter $\varphi_{Cu}$ of the first winding 221 is expressed by $\varphi_{Al} \times \sqrt{(\rho_{Cu}/\rho_{Al})}$.

Thus, if the diameter $\varphi_{Cu}$ [mm] of the first winding 221 is larger than $\varphi_{Al} \times \sqrt{(\rho_{Cu}/\rho_{Al})}$ (i.e., $\sqrt{(\varphi_{Al} \times \sqrt{(\rho_{Cu}/\rho_{Al})})} < \varphi_{Cu}$), in the first region 201, a loss larger than a loss generated in the second winding 222 can be generated in the first winding 221.

For example, supposing the electrical resistivity $\rho_{Cu}$ of the first winding 221 is $1.68 \times 10^{-8}$ [Ω·m] and the electrical resistivity $\rho_{Al}$ of the second winding 222 is $2.82 \times 10^{-8}$ [Ω·m], the lower limit of the diameter $\varphi_{Cu}$ [mm] of the first winding 221 is 0.772 times as large as the diameter $\varphi_{Al}$ [mm] of the second winding 222. That is, if the diameter $\varphi_{Cu}$ of the first winding 221 is $0.772 \times \varphi_{Al}$, the diameter of the first winding 221 is equal to the diameter of the second winding 222.

If the diameter $\varphi_{Cu}$ of the first winding 221 is larger than $0.772 \times \varphi_{Al}$ (i.e., $0.772 \times \varphi_{Al} < \varphi_{Cu}$), the electrical resistance of the first winding 221 is lower than the electrical resistance of the second winding 222. Accordingly, in the first region 201, a loss larger than a loss generated in the second winding 222 can be generated in the first winding 221.

Thus, in the first region 201, if the stator 2 satisfies $(C_1/S_1) > (A_1/S_1)$ and the diameter $\varphi_{Cu}$ of the first winding 221 is larger than $\varphi_{Al} \times \sqrt{(\rho_{Cu}/\rho_{Al})}$, a temperature rise of the coil 22 can be reduced so that heat dissipation efficiency of the stator 2 can be further enhanced.

If the mechanical strength of the second winding 222 is lower than the mechanical strength of the first winding 221, the diameter $\varphi_{Al}$ of the second winding 222 is preferably larger than the diameter $\varphi_{Cu}$ of the first winding 221. Accordingly, strength of the second winding 222 can be ensured in the winding step.

In addition, if the diameter $\varphi_{Al}$ of the second winding 222 satisfies $\varphi_{Cu} \leq \varphi_{Al} < \varphi_{Cu} \times \sqrt{(\rho_{Al}/\rho_{Cu})}$, a large loss is generated in the first windings 221 collected in the first region 201, and heat thereof can be efficiently dissipated from the first region 201 to the heat dissipation path L. Furthermore, sufficiently high strength of the second winding 222 can be ensured in the winding step.

In a process in which the coil 22 including the first winding 221 and the second winding 222 arranged in parallel is wound around the teeth 21b of the stator core 21, a common winding machine is preferably used in order to avoid complication of the process. On the other hand, in a case where the diameters of the first winding 221 and the second winding 222 are different, the nozzle diameter of a winding nozzle of a winding machine is adjusted to a wider one of these windings in general.

In a case where the diameter $\varphi_{Cu}$ of the first winding 221 is larger than a double of the diameter $\varphi_{Al}$ of the second winding 222, two lines of a thin winding, that is, the second winding 222, might be inserted in the winding nozzle so that the second winding 222 might be damaged.

Thus, the diameter $\varphi_{Cu}$ of the first winding 221 is preferably smaller than a double of the diameter $\varphi_{Al}$ of the second winding 222. That is, the relationship between the first winding 221 and the second winding 222 preferably satisfies $\varphi_{Al} \times \sqrt{(\rho_{Cu}/\rho_{Al})} < \varphi_{Cu} < \varphi_{Al} \times 2$. Accordingly, a large loss is generated in the first winding 221 collected in the first region 201, and heat of the first winding 221 is effectively dissipated from the first region 201 to the heat dissipation path L, and damage and breakage of the second winding 222 in the winding step can be avoided.

<Induction Motor>

The electric motor 1 described in the first embodiment is, for example, an induction motor.

In general, the induction motor is often driven without using an inverter. That is, a controller for controlling the electric motor 1 supplies a constant voltage to the coil 22 to drive the electric motor 1 in many cases. Thus, variations in load or supply voltage of the electric motor 1 significantly increase a current flowing in the coil 22 so that the temperature of the coil 22 might increase.

The electric motor 1 including the stator 2 according to the first embodiment has high heat dissipation efficiency as described above and is capable of reducing a temperature rise of the coil 22. Thus, especially large advantages can be obtained in an induction motor in which a variation of a current is large. The electric motor 1 may be an electric motor except for an induction motor, such as a synchronous motor. In this case, high heat dissipation efficiency can also be obtained.

Advantages of First Embodiment

For example, in a case where windings having large heat loss quantities are more densely disposed on the second side than the first side of the coil-end part 22a, heat of the stator 2 (e.g., heat of the stator core 21 and heat of the coil 22) is not easily transferred from the second side to the first side. In this case, since heat of the stator 2 is not easily dissipated to the outside of the stator 2, it is difficult to reduce a temperature rise of the stator 2. Thus, heat of the stator 2 is preferably dissipated to the heat dissipation path L1 rather than the heat dissipation path L2. In a case where a medium such as liquid (e.g., refrigerant) is present around the coil 22, heat of the coil 22 can be easily dissipated to the medium. In this case, heat of the coil 22 is more easily dissipated to the heat dissipation path L1 than to the heat dissipation path L2. Thus, the coil 22 is preferably formed such that heat is easily dissipated to the heat dissipation path L.

In the stator 2 according to this embodiment, the second windings 222 are connected to the first windings 221 in parallel, a larger number of the first windings 221 showing a large heat loss quantity are disposed on the first side than on the second side of the coil-end part 22a, and a larger number of the second windings 222 showing a small heat loss quantity are disposed on the second side than on the first side in the coil-end part 22a. Specifically, the stator 2 satisfies $(C_1/S_1) > (C_2/S_2)$. That is, the density of the first windings 221 on the first side of the coil-end part 22a, i.e., in the first region 201, is larger than the density of the first windings 221 on the second side of the coil-end part 22a, i.e., in the second region 202.

Accordingly, the first windings 221 showing a large heat loss quantity are densely arranged on the first side of the coil-end part 22a. In this manner, heat of the stator 2, especially heat of the coil 22, is efficiently transferred from the second side to the first side of the coil-end part 22a and is dissipated from the first side to the heat dissipation path L1. Thus, heat dissipation efficiency in the coil-end part 22a of the coil 22 can be enhanced, and a temperature rise in the stator 2 (especially, the coil 22) at high-speed rotation of the electric motor 1 can be reduced. Consequently, power of the electric motor 1 including the stator 2 can be enhanced.

In addition, the stator 2 preferably satisfies $(C_1/S_1) > (A_1/S_1)$. Accordingly, heat of the coil 22 is efficiently dissipated from the first side to the heat dissipation path L. Thus, heat dissipation efficiency in the stator 2 can be further enhanced, and a temperature rise in the stator 2 can be reduced.

In addition, the stator 2 preferably satisfies $(C_1/A_1) > (C_2/A_2)$. Accordingly, heat of the stator 2, especially heat of the coil 22, is efficiently transferred from the second side to the first side of the coil-end part 22a, and can be easily dissipated from the first side to the heat dissipation path L. Consequently, heat dissipation efficiency in the stator 2 can be further enhanced, and a temperature rise in the stator 2 can be reduced.

Only at least one first winding 221 may be disposed on the first side of the coil-end part 22a. In this case, no second winding 222 is present on the first side of the coil-end part 22a. Accordingly, only the first winding 221 showing a large heat loss quantity can be disposed on the first side of the coil-end part 22a, that is, in the first region 201. Thus, heat of the coil 22 can be easily dissipated from the first side to the heat dissipation path L. Consequently, heat dissipation efficiency in the stator 2 can be further enhanced, and a temperature rise in the stator 2 can be reduced.

The stator 2 also preferably satisfies $(CO_1/SO_1) > (Ci_1/Si_1)$. Accordingly, many of the first windings 221 showing large heat loss quantities can be disposed in a region of the coil 22 exposed to the outside. That is, in the first region 201, many of the first windings 221 can be disposed outside the region surrounded by the radius r. Consequently, heat dissipation efficiency in the stator 2 can be further enhanced, and a temperature rise in the stator 2 can be reduced.

Since the first winding 221 and the second winding 222 are connected to each other in parallel, the values of currents flowing in the first winding 221 and the second winding 222 are different. Since the electrical resistance $R_{Cu}$ of the first winding 221 is lower than the electrical resistance RA of the second winding 222, a current easily flows in the first winding 221 having low electrical resistance. Accordingly, a heat loss quantity generated in the first winding 221 is larger than a heat loss quantity generated in the second winding 222. Thus, as described above, many of the first windings 221 are arranged in the first region 201 so that heat dissipation efficiency in the coil-end part 22a can be enhanced.

In a case where the diameter $\varphi_{Cu}$ of the first winding 221 is larger than $\varphi_{Al} \times \sqrt{(\rho_{Cu}/\rho_{Al})}$, a loss larger than a loss generated in the second winding 222 can be generated in the first winding 221 in the first region 201. In this manner, heat dissipation efficiency can be enhanced as described above.

A relationship between the first winding 221 and the second winding 222 preferably satisfies $\varphi_{Al} \times \sqrt{(\rho_{Cu}/\rho_{Al})} < \varphi_{Cu} < \varphi_{Al} \times 2$. Accordingly, a large loss is generated in the first winding 221 collected in the first region 201, and heat of the first winding 221 is effectively dissipated from the first region 201 to the heat dissipation path L, and damage and breakage of the second winding 222 in the winding step can be avoided.

In addition, in a case where the relationship between the first winding 221 and the second winding 222 satisfies $\varphi_{Al} \times \sqrt{(\rho_{Cu}/\rho_{Al})} < \varphi_{Cu} < \varphi_{Al}$, a large loss is generated in the first winding 221 collected in the first region 201, and heat thereof can be efficiently dissipated from the first region 201 to the heat dissipation path L. Furthermore, sufficiently high strength of the second winding 222 can be ensured in the winding step.

The electric motor 1 including the stator 2 according to the first embodiment has advantages of the stator 2 described above. In addition, application of the electric motor 1 including the stator 2 according to the first embodiment provides especially high advantages.

Second Embodiment

<Scroll Compressor>

Next, a scroll compressor 300 as a compressor to which the electric motor 1 described in the first embodiment is applied will be described.

Figure 6:
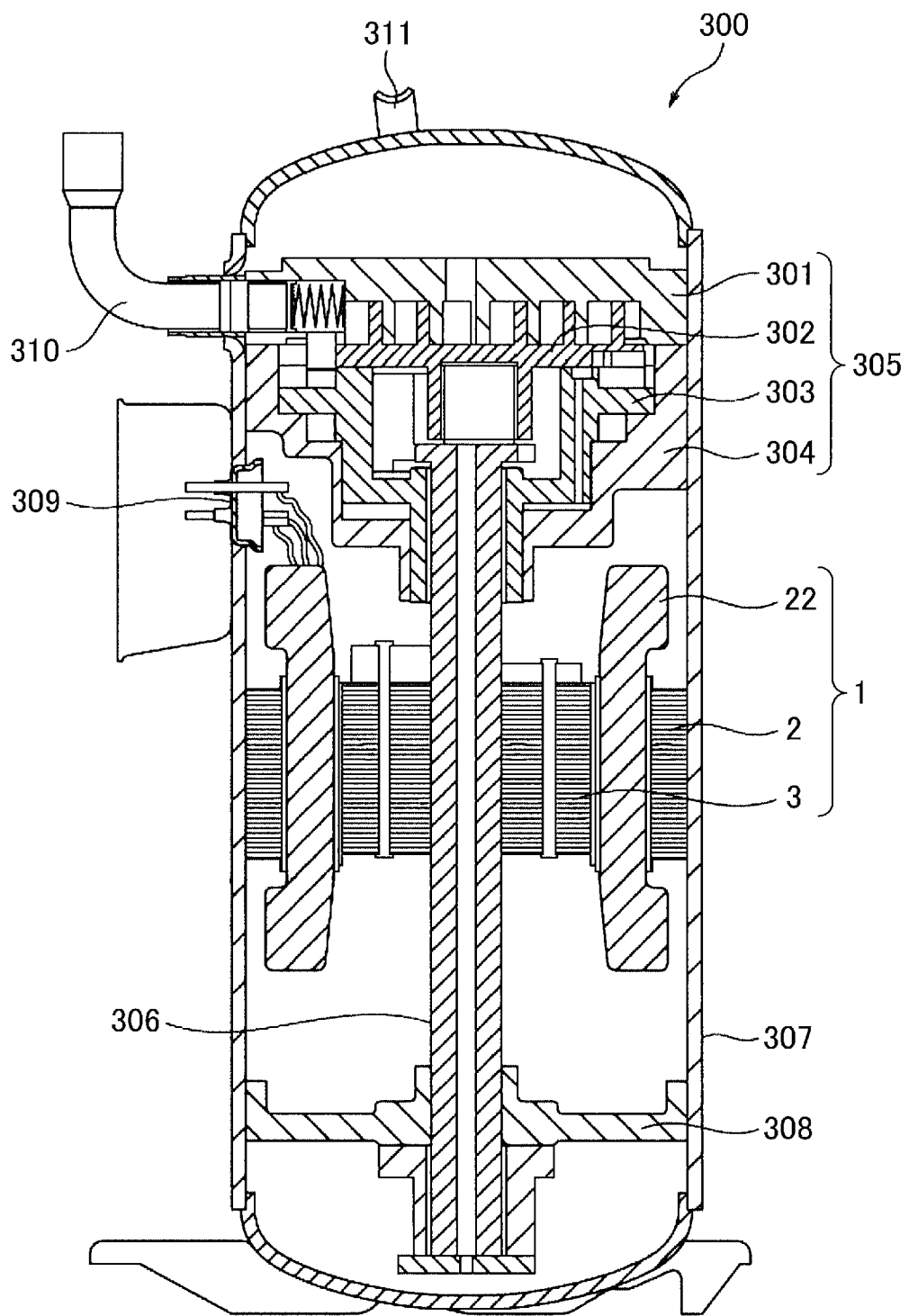
FIG. 6 is a cross-sectional view illustrating a scroll compressor.

FIG. 6 is a cross-sectional view illustrating the scroll compressor 300.

The scroll compressor 300 includes a closed container 307, a compressor mechanism 305 disposed in the closed container 307, an electric motor 1 for driving the compressor mechanism 305, a shaft 306 for coupling the compressor mechanism 305 and the electric motor 1 to each other, and a subframe 308 supporting the lower end of the shaft 306 (i.e., an opposite end from the compressor mechanism 305).

The compressor mechanism 305 includes a fixed scroll 301 having a spiral portion, a swing scroll 302 having a spiral portion forming a compression chamber between the spiral portion of the swing scroll 302 and the spiral portion of the fixed scroll 301, a compliance frame 303 holding the upper end of the shaft 306, and a guide frame 304 fixed to the closed container 307 and holding the compliance frame 303.

A suction pipe 310 penetrating the closed container 307 is press fitted in the fixed scroll 301. The closed container 307 is provided with a discharge pipe 311 that discharges a high-pressure refrigerant gas discharged from the fixed scroll 301, to the outside. The discharge pipe 311 communicates with an opening (not shown) disposed between the compressor mechanism 305 of the closed container 307 and the electric motor 1.

The electric motor 1 is fixed to the closed container 307 by fitting the stator 2 in the closed container 307. The configuration of the electric motor 1 has been described above. To the closed container 307, a glass terminal 309 for supplying electric power to the electric motor 1 is fixed by welding.

When the electric motor 1 rotates, this rotation is transferred to the swing scroll 302, and the swing scroll 302 swings. When the swing scroll 302 swings, the volume of the compression chamber formed by the spiral portion of the swing scroll 302 and the spiral portion of the fixed scroll 301 changes. Then, a refrigerant gas is sucked through the suction pipe 310, compressed, and then discharged from the discharge pipe 311.

While the electric motor 1 rotates, a current flows in the coil 22, and heat is generated in the coil 22. Heat generated in the coil 22 is dissipated to the outside of the stator 2 as described in the first embodiment.

The scroll compressor 300 includes the electric motor 1 described in the first embodiment, and thus, has advantages described in the first embodiment. In addition, since the electric motor 1 including the stator 2 according to the first embodiment has high heat dissipation efficiency, a temperature rise in the scroll compressor 300 can be reduced. In addition, as described in the first embodiment, since power of the electric motor 1 can be enhanced, power of the scroll compressor 300 can also be enhanced.

The electric motor 1 described in the first embodiment may be applied to a compressor except for the scroll compressor 300.

Third Embodiment

<Air Conditioner>

Next, an air conditioner 400 to which the electric motor 1 described in the first embodiment is applied will be described.

Figure 7:
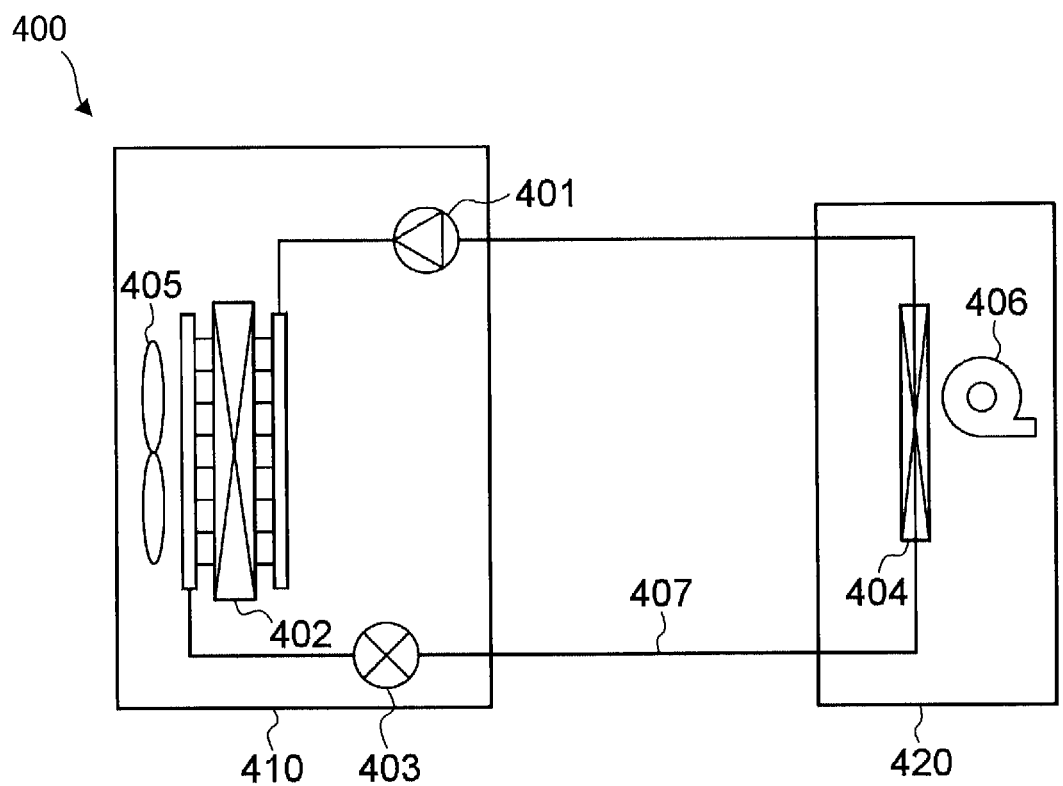
FIG. 7 is a diagram illustrating an air conditioner (also referred to as a refrigeration cycle apparatus).

FIG. 7 is a diagram illustrating the air conditioner 400 (also referred to as a refrigeration cycle apparatus).

The air conditioner 400 includes a compressor 401, a condenser 402, a throttling device (also referred to as a decompressor) 403, and an evaporator 404. The compressor 401, the condenser 402, the throttling device 403, and the evaporator 404 are coupled to one another by a refrigerant pipe 407 to thereby constitute a refrigeration cycle. That is, a refrigerant circulates in the compressor 401, the condenser 402, the throttling device 403, and the evaporator 404 in this order.

The compressor 401, the condenser 402, and the throttling device 403 are provided in an outdoor unit 410. The compressor 401 is the scroll compressor 300 described in the second embodiment. Alternatively, the compressor 401 may be a compressor except for the scroll compressor as long as the compressor 401 includes the electric motor 1 including the stator 2 described in the first embodiment. The outdoor unit 410 includes an outdoor-side fan 405 for supplying outdoor air to the condenser 402. The evaporator 404 is disposed in an indoor unit 420. The indoor unit 420 includes an indoor-side fan 406 for supplying indoor air to the evaporator 404.

An example of operation of the air conditioner 400 will be described. The compressor 401 compresses a sucked refrigerant and sends the compressed refrigerant. The condenser 402 performs heat exchange between the refrigerant that flowed from the compressor 401 and outdoor air, condenses the refrigerant to liquefy the refrigerant, and sends the resulting refrigerant to the refrigerant pipe 407. The outdoor-side fan 405 supplies outdoor air to the condenser 402. The throttling device 403 adjusts, for example, the pressure of the refrigerant flowing in the refrigerant pipe 407 by adjusting the opening degree of the throttling device 403.

The evaporator 404 performs heat exchange between the refrigerant changed to a low-pressure state by the throttling device 403 and indoor air, causes the refrigerant to take heat from the air to vaporize the refrigerant, and sends the resulting refrigerant to the refrigerant pipe 407. The indoor-side fan 406 supplies indoor air to the evaporator 404. Accordingly, cold air from which heat has been taken by the evaporator 404 is supplied into the room.

The air conditioner 400 includes the electric motor 1 described in the first embodiment, and thus, has advantages described in the first embodiment. In addition, the air conditioner 400 includes, as the compressor 401, the scroll compressor 300 described in the second embodiment, and thus, has advantages described in the second embodiment. As described above, since the electric motor 1 described in the first embodiment has high heat dissipation efficiency, a temperature rise in the compressor 401 can be reduced so that a stable operation of the air conditioner 400 can be thereby achieved. In addition, with an increase in power of the compressor 401 achieved by an increase in power of the electric motor 1, power of the air conditioner 400 can also be increased.

Although the preferred embodiments of the present invention have been described above, the present invention is not limited to the embodiments, and various modifications and changes can be made within the gist of the present invention.

What is claimed is:

1. A stator comprising:
a stator core; and
a coil wound around the stator core and including at least one first winding and at least one second winding connected to the at least one first winding in parallel, the at least one second winding being formed of a material different from the at least one first winding, wherein
the coil includes a coil-end part located outside the stator core,
the stator satisfies:

$$(C_1/S_1) > (C_2/S_2)$$

where P1 is a straight line that halves a maximum height of the coil-end part from a point of contact of the coil with the stator core in the coil-end part, $S_1$ is a total cross-sectional area on a first side of the coil-end part that is an opposite side of the straight line P1 from the stator core, $S_2$ is a total cross-sectional area on a second side of the coil-end part that is an opposite side of the straight line P1 from the first side, $C_1$ is a total cross-sectional area of the at least one first winding on the first side of the coil-end part, and $C_2$ is a total cross-sectional area of the at least one first winding on the second side of the coil-end part, and the stator satisfies:

$$\varphi_{Al} \times \sqrt{\frac{\rho_{Cu}}{\rho_{Al}}} < \varphi_{Cu}$$

where $\varphi_{Cu}$ [mm] is a diameter of the first winding, $\varphi_{Al}$ [mm] is a diameter of the second winding, $\rho_{Cu}$ [Ω·m] is electrical resistivity of the first winding, and $\rho_{Al}$ [Ω·m] is electrical resistivity of the second winding.

2. The stator according to claim 1, wherein the stator satisfies:

$$(C_1/S_1) > (A_1/S_1)$$

where $A_1$ is a total cross-sectional area of the at least one second winding disposed on the first side of the coil-end part.

3. The stator according to claim 1, wherein the stator satisfies:

$$(C_1/A_1) > (C_2/A_2)$$

where $A_1$ is a total cross-sectional area of the at least one second winding disposed on the first side of the coil-end part and $A_2$ is a total cross-sectional area of the at least one second winding disposed on the second side of the coil-end part.

4. The stator according to claim 1, wherein only the at least one first winding is disposed on the first side of the coil-end part.

5. The stator according to claim 1, wherein the stator satisfies:

$$(CO_1/SO_1) > (Ci_1/Si_1)$$

where P2 is a straight line that halves the straight line P1 on a cross section of the coil-end part, r is a radius about an intersection point of the straight line P1 and the straight line P2 on the cross section of the coil-end part, the radius r is smaller than each of a half of a length of the straight line P1 and a half of a length of the straight line P2 on the cross section of the coil-end part, $SO_1$ is a total cross-sectional area of a portion located outside a region surrounded by the radius r on the first side of the coil-end part, $Si_1$ is a total cross-sectional area of the region surrounded by the radius r on the first side of the coil-end part, $CO_1/SO_1$ is a ratio of the at least one first winding to the total cross-sectional area $SO_1$, and $Ci_1/Si_1$ is a ratio of the at least one first winding to the total cross-sectional area $Si_1$.

6. The stator according to claim 1, wherein the coil is wound around the stator core by distributed winding.

7. The stator according to claim 1, wherein the stator satisfies:

$$\phi_{Al} \times \sqrt{\frac{\rho_{Cu}}{\rho_{Al}}} < \phi_{Cu} < \phi_{Al} \times 2 \qquad [\text{Eq. 2}]$$

where $\phi_{Cu}$ [mm] is the diameter of the first winding, $\phi_{Al}$ [mm] is the diameter of the second winding, $\rho_{Cu}$ [Ω·m] is the electrical resistivity of the first winding, and $\rho_{Al}$ [Ω·m] is the electrical resistivity of the second winding.

8. The stator according to claim 1, wherein the at least one first winding is a copper wire.

9. The stator according to claim 1, wherein the at least one second winding is an aluminum wire.

10. An electric motor comprising:
    the stator according to claim 1; and
    a rotor rotatably disposed inside the stator.

11. The electric motor according to claim 10, wherein the electric motor is an induction motor.

12. A compressor comprising:
    a closed container;
    a compressor mechanism disposed in the closed container; and
    the electric motor according to claim 10 to drive the compressor mechanism.

13. An air conditioner comprising:
    the compressor according to claim 12;
    a condenser;
    a decompressor; and
    an evaporator.

\* \* \* \* \*